United States Patent
Langhans et al.

(10) Patent No.: US 6,788,723 B1
(45) Date of Patent: Sep. 7, 2004

(54) RESONATOR ARRAY FOR SOLID-STATE LASERS

(75) Inventors: Lutz Langhans, Starnberg (DE); Thomas Renner, München (DE)

(73) Assignee: Carl Baasel Lasertechnik GmbH, Starnberg (DE)

(*) Notice: Subject to any disclaimer, the term of this patent is extended or adjusted under 35 U.S.C. 154(b) by 0 days.

(21) Appl. No.: 09/445,990

(22) PCT Filed: Apr. 22, 1999

(86) PCT No.: PCT/EP99/02724
§ 371 (c)(1), (2), (4) Date: Dec. 16, 1999

(87) PCT Pub. No.: WO99/54970
PCT Pub. Date: Oct. 28, 1999

(30) Foreign Application Priority Data

Apr. 22, 1998 (DE) .......................................... 198 17 848
Jun. 10, 1998 (DE) .......................................... 198 25 827

(51) Int. Cl.[7] .............................. H01S 3/06; H01S 3/16
(52) U.S. Cl. .............................. 372/66; 372/40; 372/41
(58) Field of Search .......................... 372/9, 43, 40–42, 372/66, 70–75

(56) References Cited

U.S. PATENT DOCUMENTS

| | | | | |
|---|---|---|---|---|
| 3,680,000 A | * | 7/1972 | Chesler et al. ................. | 372/99 |
| 3,975,694 A | * | 8/1976 | Melamed et al. ............. | 372/11 |
| 4,310,808 A | | 1/1982 | Byer et al. | |
| 5,022,043 A | | 6/1991 | Jacobs | |
| 5,086,432 A | * | 2/1992 | Esterowitz et al. ............ | 372/71 |
| 5,615,043 A | * | 3/1997 | Plaessmann ................. | 359/346 |
| 5,692,005 A | | 11/1997 | Maag et al. | |
| 5,699,376 A | * | 12/1997 | Richmond ................... | 372/68 |
| 5,909,456 A | * | 6/1999 | Oka .............................. | 372/22 |
| 5,999,554 A | * | 12/1999 | Marshall ..................... | 372/71 |
| 6,014,393 A | * | 1/2000 | Fulbert et al. ................ | 372/41 |
| 6,129,721 A | * | 10/2000 | Kataoka et al. ................ | 606/2 |

FOREIGN PATENT DOCUMENTS

| CA | 1 164 990 A | 4/1984 |
|---|---|---|
| WO | WO 90/13157 A1 | 11/1990 |

OTHER PUBLICATIONS

Publication by Magni, V. et al.: "Recent Developments in Laser Resonator Design" in Optical and Quantum Electronics 23, 1991, pp. 1105–1134.

Weber, H: Laserresonatoren und Strahlqualität—Resonators and Beam Quality. In: Laser and Optoelektronik No. Feb. 1988, p. 60–66.

Magni, V., et al.: Recent developments in laser resonator design. In: Optical and Quantum Electronics 23, 1991, p. 1105–1134.

(List continued on next page.)

Primary Examiner—Don Wong
Assistant Examiner—James Menefee
(74) Attorney, Agent, or Firm—Fulbright & Jaworski LLP

(57) ABSTRACT

A stable resonator for solid-state lasers which exhibit a thermally induced lensing effect, includes a laser rod, a rear mirror and a semi-reflecting output mirror. The invention is characterized in that the rear mirror has an extremely asymmetrical configuration, allowing the laser rod to move totally or almost totally toward the side of the output mirror. The laser rod is curved in a convex manner on one end in order to achieve a refractive effect, and a convex rear mirror is provided. As a result of the extreme asymmetry, the resonator has a beam quality as a function of the pump power with a comparably flat maximum even at relatively short resonator lengths in contrast to the state of the art. The effects of the thermal lens have practically no influence on processing results. Starting pulse behavior lies below the detection limit.

24 Claims, 3 Drawing Sheets

OTHER PUBLICATIONS

Pavel, N., et al.: Positive–branch unstable resonators with thermal lens compensation. In: Optics & Laser Technology, vol. 28, No. 6, 1996, p. 451–455.

Metcalf, David, et al.: Laser resonators containing self-focusing elements. In: Applied Optics, vol. 26, No. 21, Nov. 1987, p. 4508–4518.

* cited by examiner

RESONATOR ARRAY FOR SOLID-STATE LASERS

TECHNICAL FIELD AND STATE-OF-THE-ART

During the past years, Nd:YAG welding lasers have found increasing applications in the areas of jewelry and dentistry. These so-called handheld welding lasers are suitable to perform precise point and seam welding in the sub-millimeter region. They have not only the advantage of providing solder-free joints, but also protect the workpiece as compared to the conventional flame welding technique. A typical construction of devices presently on the market is illustrated in FIG. 1. The conventional "classic" resonators are mostly constructed in the manner illustrated in FIG. 2a and have a planar output mirror 2 and a concave reflecting mirror 3. The Nd:YAG laser rod 1 is located approximately in the center between the mirrors 2 and 3.

The exiting laser beam 4 is focused onto the work plane 8 by a beam expander 5 with an adjustable divergence, a turning mirror 6 (for example, 1064 nm—HR, visible range—AR) and a focusing lens 7.

All devices encounter problems associated with "thermal lensing" of the Nd:YAG rod and the "initial pulse characteristics" associated therewith. Pumping with a flash lamp and water cooling produces a radial temperature profile in the Nd:YAG rod, which is transformed by the characteristic material constant dn/dT into a refractive index profile and thereby into a lensing effect. Depending on the injected pump energy and the cooling provided by the cooling water, respectively, this lensing effect depends on the pump power. FIG. 3 illustrates the initial pulse characteristics for a state-of-the-art "classic resonator", wherein the spot size at the focal point is simulated without beam expansion as a function of the pump power, i.e. with varying thermal lensing effect and for different radii of the reflecting mirror. The increase of the focal diameter with increasing pump power is clearly seen. Smaller radii of curvature of the reflecting mirror lead to a smaller relative change, but to overall larger values of the focal diameter. For single pulses or for initial pulses (low pump power), the lensing effect is still small. For continuous pulses (high pump power) and a predetermined frequency the lens increases to a value which depends on the average pump power in continuous operation. This lensing effect affects the beam quality and thereby also the spot size in the work plane as well as (to a lesser degree) the pulse energy. The user who is mainly interested in the energy density, i.e. the pulse energy divided by the spot size, will recognize this phenomenon as a strongly variable welding outcome which depends on the welding history.

One possibility to avoid this problem is to transmit the laser beam through a sufficiently long glass fiber. Since the glass fiber does not preserve the diameter of the beam, the beam which is coupled out typically has a constant diameter and an approximately constant divergence. However, this approach degrades the beam quality, so that the focusing unit has to be adapted accordingly. Moreover, the so-called "benign behavior" of the welding process suffers, since the depth of focus in the work plane is reduced. Another possibility to avoid this problem is to use a stronger beam expansion before the beam splitter and to also work outside the focusing range, where the image of the rod surface remains approximately constant. This approach also reduces the initial pulse characteristics. However, the "benign behavior" is again adversely affected (depth of focus of the laser focusing system in the work plane).

The publication by MAGNI, V. et al.: "Recent Developments In Laser Resonator Design" in Optical and Quantum Electronics 23, 1991,pp. 1105–1134, in particular page 1106,second paragraph, describes additional measures to counteract or even compensate the effect of thermal lensing. These conventional measures, however, are only effective at a specified value of the pump power.

SUMMARY OF THE INVENTION

It is an object of the invention to provide a stable resonator which is stable over an extended range of the pump power against the effects caused by thermal lensing, rather than only at a specific value of the pump power. The resonator according to the invention should also reduce the initial pulse characteristics below the detection limit of the user, while at the same time maintaining the "benign behavior", i.e. the depth of focus, of the laser.

The solution of this object is provided by resonators as described in the commensurate claims 1, 3, 4 and 5. The applicant has realized that, unlike in state-of-the-art devices, the beam quality as a function of the pump power has a comparably flat maximum for relatively short resonator lengths due to the extremely asymmetric construction of the resonators according to the invention. Accordingly, the applicant achieves a comparably constant beam quality over a larger pump power range. As a result, the thermal lensing effect has no effect or only an insignificant effect on the welding result; the characteristics features of the initial pulse are negligibly small. While the laser rod in the embodiments recited in the commensurate claims 1 and 4 is completely displaced towards the output side, in the other advantageous embodiments recited in claims 3 and 5 the laser rod may be located at a very short distance from the output mirror.

BRIEF DESCRIPTION OF THE DRAWING

The invention will be described hereinafter with reference to the Figures and diagrams showing calculated and measured values. It is shown in.

DETAILED DESCRIPTION OF PREFERRED EMBODIMENTS

Figure 1:
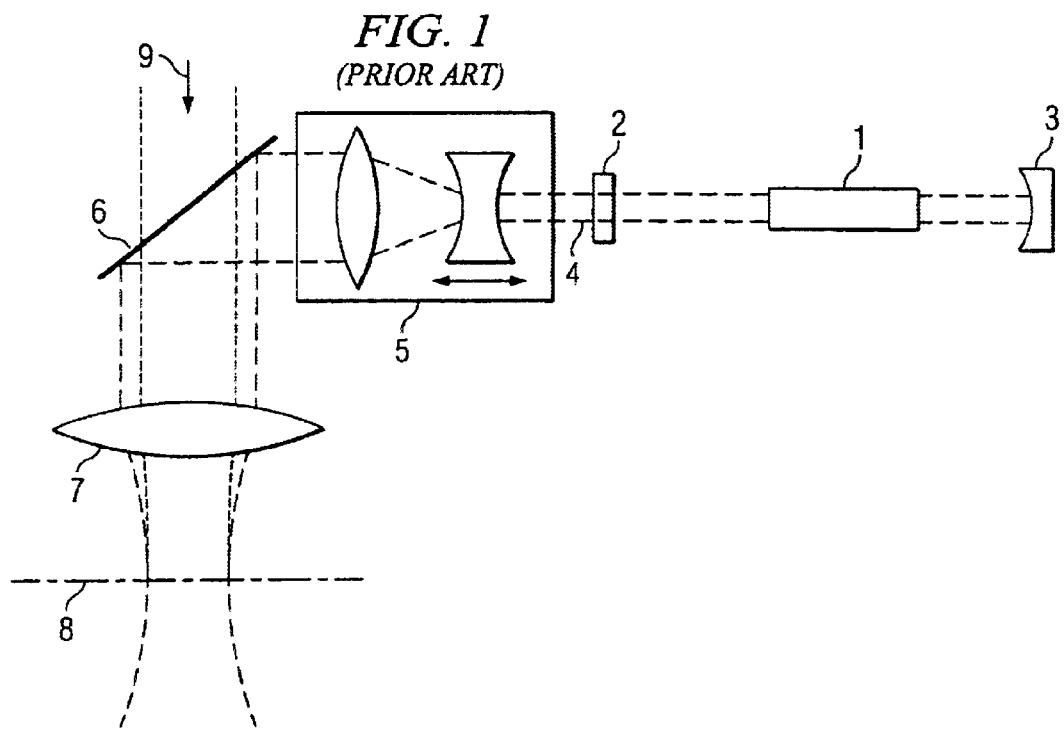
FIG. 1 a Nd:YAG welding laser according to the state-of-the-art.
Figure 2A:
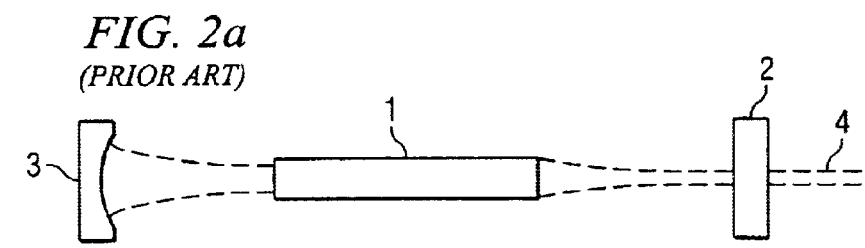
FIG. 2a a classic resonator according to the state-of-the-art.
Figure 2B:
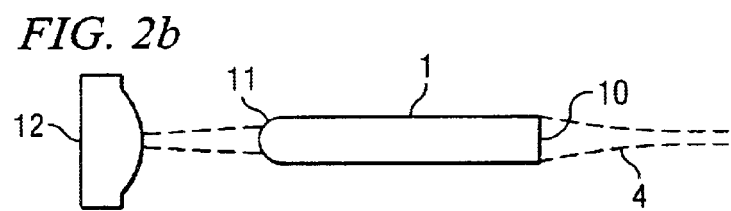
FIG. 2b a first embodiment of a resonator according to the invention (so-called "sweet-spot"-resonator I)

According to FIG. 2b, the resonator of the invention has an extremely asymmetric configuration. The laser rod 1 is planar on the output side and completely displaced towards the output side, wherein the planar rod end is provided with a semi-reflecting layer 10 to couple out the laser beam 4.

The other rod end 11 has a convex curvature and operates as a focusing lens in the resonator. The rear reflecting mirror 12 also has a convex curvature. This special arrangement of the components in conjunction with a suitable arrangement of the resonator lengths and the respective radii of curvature provides a resonator which produces a small focus with a short overall length, wherein the focus is almost independent of the frequency and the pump power, respectively. The components may be arranged as follows:

Length of the resonator: 290 mm

Radius of curvature of the rear mirror: 0.1 m convex (cvx)

Radius of curvature of the Nd:YAG rod: 0.22 m convex (cvx)

Length of Nd:YAG rod: 90 mm

Figure 5:
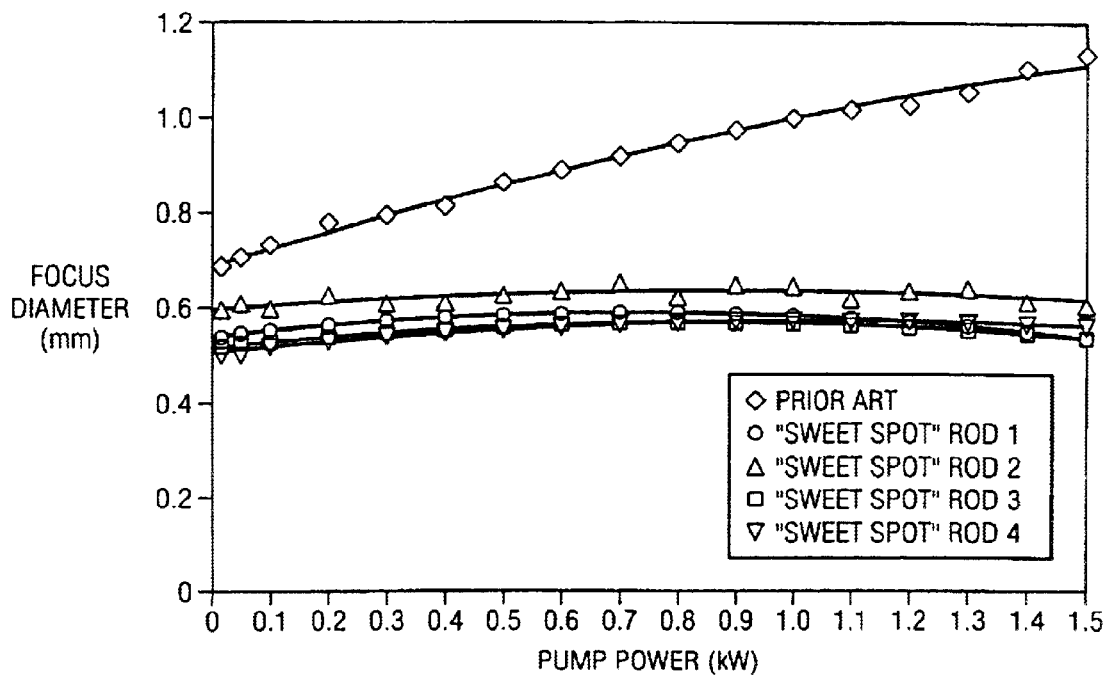
FIG. 5 the focus diameter of a state-of-the-art resonator (upper curve) and of a "sweet-spot"-resonator of the invention for different laser rods (lower four curves) as a function of the pump power (measured values)

The measured values illustrated in FIG. 5 relate to the aforedescribed resonator.

Figure 4:
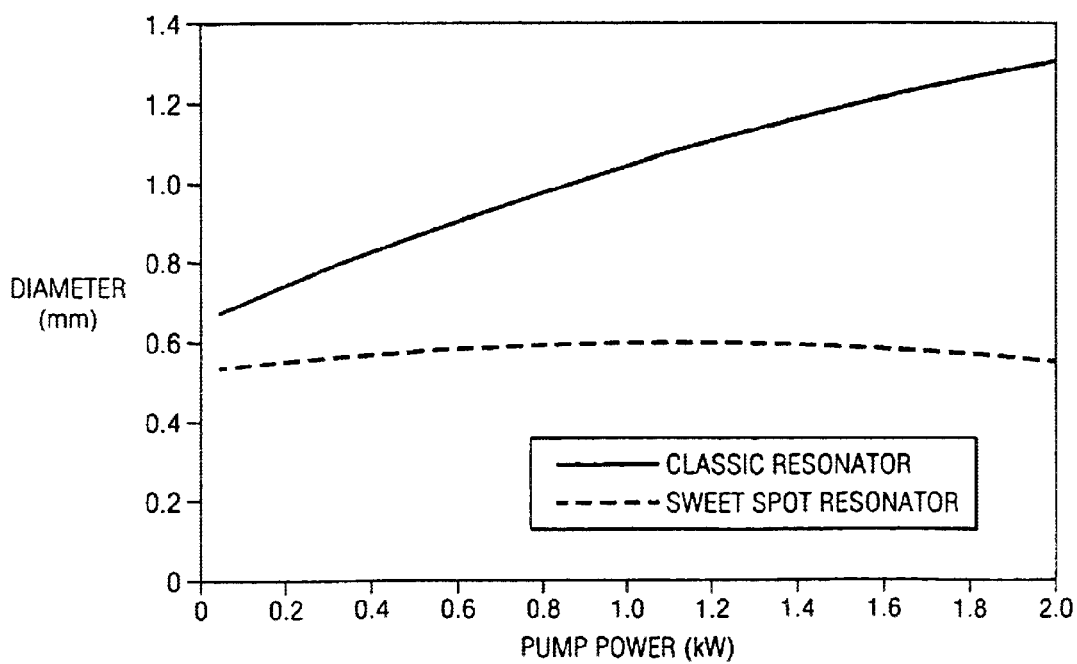
FIG. 4 the focus diameter of a state-of-the-art resonator (upper curve) and of a "sweet-spot"-resonator of the invention (lower curve) as a function of the pump power (simulation)

FIG. 4 shows a simulated comparison between a "classic" resonator (upper curve) and the novel "sweet spot" resonator according to FIG. 2b (lower curve). As seen in FIG. 4, the "sweet spot" resonator not only has an approximately constant focus diameter, whereas the focus diameter of the "classic" resonator increases with increasing pump power and therefore also with increasing thermal lensing effect; moreover, the focus diameter is significantly smaller across the entire range. FIG. 4 shows that the focus diameter changes from about 0.55 mm at about 0.04 kW power, to about 0.60 at about 1 kW power, and then to about 0.56 mm at about 2 kW power. This results in a change of focus diameter of less than 9.1% over a range of at least 1 kW. The calculated results are supported by the measurements shown in FIG. 5 (1 "state-of-the-art" rod, 4 different rods of the "sweet spot" resonator according to the invention). The measurements were taken with a CCD camera; other data are: focusing lens with f=116 mm, Pmax=1.5 kW and a distance from the focusing lens to the end of the rod=450 mm.

Similar results can be all obtained with slightly altered parameters (radius of curvature & resonator length).

The relevant feature is that at the exemplary pump powers the resonator length can be reduced to a value significantly less than 500 mm by using two convex radii (rear mirror & rod).

Using a commercially available computer program for resonators and based on the observations by the applicant, that the welding result are unaffected by thermal lensing effects over a large range of pump power in particular with an extremely asymmetric resonator, additional resonator configurations can be determined as follows.

Figure 6:
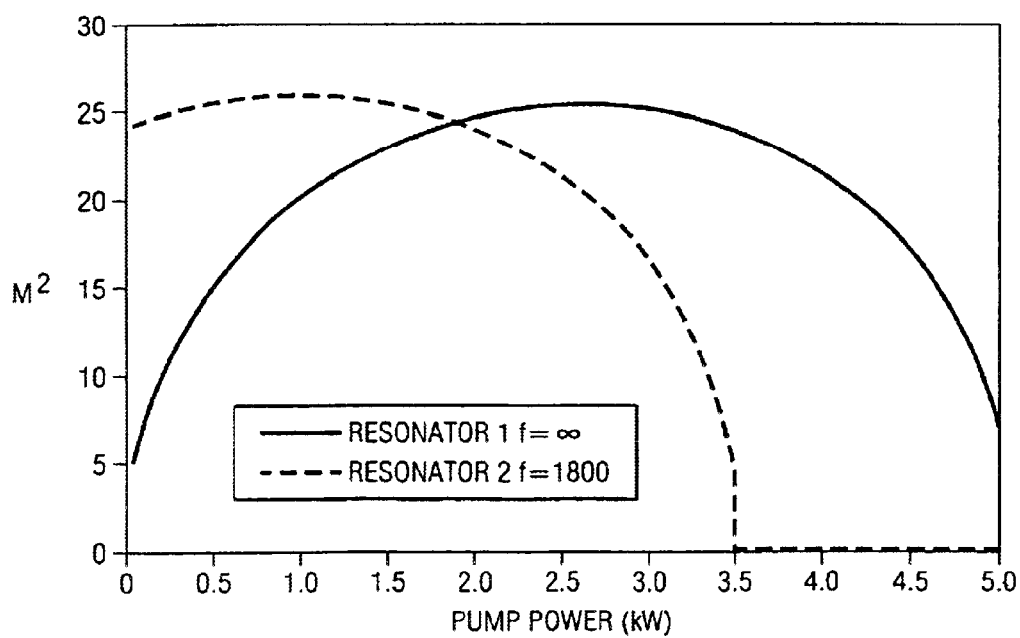
FIG. 6 the beam quality M as a function of the pump power in multi-mode operation for a resonator arrangement with L=650 mm, R=infinite, f=infinite (curve 1), and f=1800 mm (curve 2)

The beam quality M2 is computed with the computer program for resonators and the function of the pump energy and is printed as a curve (FIG. 6). (M2 is used instead of $M^2$)

1. The program is initiated with an extremely asymmetric planar-planar resonator configuration, i.e., the laser rod is not curved (corresponds to an internal lens with a focal length f=infinite, and the radii of curvature of both the rear mirror and the output mirror are also R=infinite; with these boundary conditions, the beam quality M2 is calculated as a function of pump energy for different values of the resonator length L and a specific value of L (Lo) is determined, where the beam quality has the desired maximum value (in the present example, the maximum value is set to be M2=25, which is a typical value for laser welding applications). The position of the maximum does not change when L is varied. The curve, however, bulges upwardly (for values of L less than Lo) or collapsed downwardly (for values of L greater than Lo).

2. If the maximum of the beam quality M2 is not located in the range of pump powers where the system is to be operated according to the application-specific conditions, as in the aforedescribed asymmetric planar-planar resonator configuration, then the radius of curvature of the end of the laser rod which faces the rear mirror, decreases from planar, i.e., R(rod)=infinite, and becomes finite. The lens formed by the curved surface can also be employed to characterize the resonator instead of the radius of curvature of the end of the laser rod. The focal length of the curved end of the laser rod therefore varies from planar, i.e. f=infinite and decreases to finite values. Accordingly, different f-values are entered into the computer program, wherein the maximum shifts to the left to smaller pump powers with decreasing f-values. The value fo, for which the maximum of the curve is located in the center of the desired pump power range, is determined by trial and error. In the present example, the center of the desired pump power range is approximately 1 kW, ranging from 0 to 2 kW.

3. If a shorter resonator is to be used with the same value of M2=25 to attain a more compact system (as is usually the case), then the beam quality M2 is again calculated, as under item 1 above, for a planar-planar resonator, i.e., the laser rod is not curved (corresponds to an internal lens with a focal length of f=infinite) and the radii of curvature of the rear mirror and of the output mirror are infinite. Since L is now smaller than Lo, the maximum is now greater than M2=25 (see item 1 above, last sentence). The radius R of the rear mirror is now reduced until the maximum is again at 25.

4. The focal length of the curved end of the laser rod is then reduced according to item 2, until the maximum falls again in the center of the desired pump power range, in the present example approximately 1 kW, ranging from 0 to 2 kW. The result is a novel resonator with the desired characteristics.

With a similar process, additional resonator arrangements can be determined for M2=25 by adjusting R for the desired L so that the maximum is=25 and by shifting the location of the maximum by varying f. Accordingly, the respective values of R and f can be determined for other values of M2 and the desired resonator lengths L.

In the following, several values are listed for a "sweet spot" resonator according to the invention, wherein the rod has a length of 85 mm. Other rod lengths give slightly different results.

| L<br>Resonator<br>length<br>(mm) | f<br>Focal length of<br>the internal lens<br>(mm) | R<br>Radius of the<br>rear mirror<br>(mm) |
|---|---|---|
| 650 | 1800 | $-\infty$ |
| 320 | 325 | $-170$ |
| 290 | 270 | $-100$ |
| 265 | 230 | $-85$ |
| 215 | 155 | $-40$ |

The values in the table can be described empirically by the following formulas.:

$$R = \text{const} \times (L/Lo - L)^2$$

$$f = f_0 \times (L/Lo)^{2.4}$$

Figure 2C:
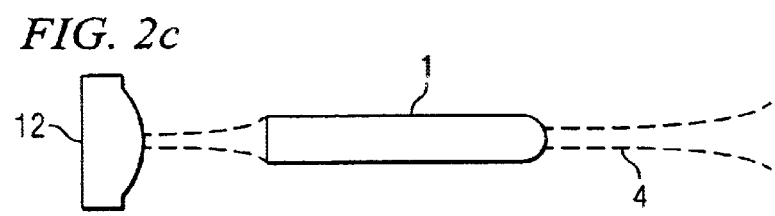
FIG. 2c a second embodiment of a resonator according to the invention (so-called "sweet-spot"-resonator II)
Figure 3:
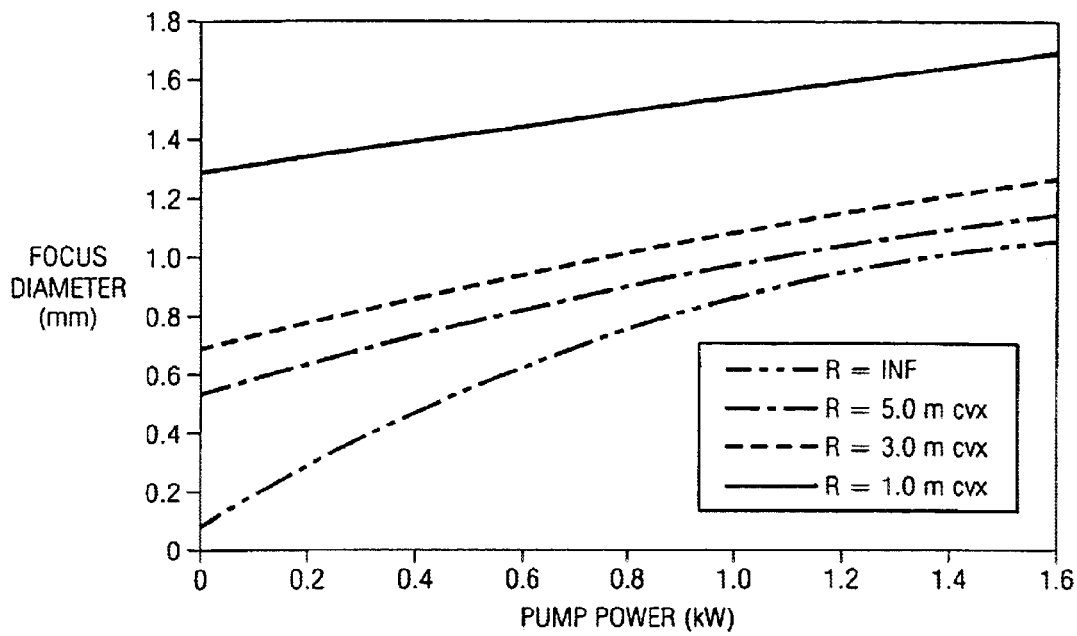
FIG. 3 a simulation of the initial pulse characteristics for a state-of-the-art classic resonator.

In a second embodiment shown in FIG. 2c, the "sweet spot" resonator II of the invention is constructed so that the laser rod 1 is planar on the side facing the convex mirror 12, and is convex and semi-reflecting on the opposite side witch is the output side. This embodiment has the same advantages as the "sweet spot" resonator I illustrated in FIG. 2b. With a corresponding design of the resonator length and the respective radii of curvature, this special arrangement of the components also provides a resonator which has a short overall length and produces a small focus which is substantially independent of the frequency and the pump power.

In the following, several value are listed for a "sweet spot" resonator II according to the invention (rod length=85 mm).

| L Resonator length (mm) | A Radius of the output mirror or rod end (mm) | R Radius of the rear mirror (mm) |
| --- | --- | --- |
| 650 | 2000 | −∞ |
| 320 | 400 | −240 |
| 290 | 350 | −175 |
| 265 | 300 | −140 |
| 215 | 215 | −70 |

The table was created in the same manner as for "sweet spot" resonator I.

The beam quality M2 is calculated using a commercially available computer program for resonators as a function of the pump energy and printed as a curve.

1. The length Lo is determined for a planar-planar resonator configuration with A=infinite, so that the maximum value of M2 assumes a predetermined value (in this case M2=25).
2. The value for $A_0$ is then determined in such a way that the maximum value of the curve is located in the center of the desired pump power range (in this case at 1 kW, range 0–2 kW).

This completes the first line.

If shorter resonators with the same properties are desired, then the following process applies:

3. The M2 curve is calculated for a shorter length L<Lo, and a curve with a maximum value of greater than 25 is obtained. The value for R is then lowered until the maximum is again located at 25.
4. The value for A is then lowered until the maximum is again located at the center of the desired range.

This process produces a new resonator with the desired features. In this way, respective values of R and A can be determined for each specified value of M2 and L.

These values can also be determined empirically by the following formulae:

$$R = C \times (L/Lo - L)^{1.9} \quad C = -254$$

$$A = A_0 \times (L/Lo)^{2.1}$$

It should be noted that the pulse energy is also almost independent of the history of the pump power. Accordingly, both the focus diameter and the energy density remain constant, which is of paramount interest for the user.

The preferred field of application of this invention are Nd:YAG welding lasers with a resonator length of less than 500 mm and a maximum average pump power of up to 2 kW (this corresponds to approximately 60 W average laser power).

LIST OF REFERENCE NUMERALS

1 Nd:YAG laser rod
2 output mirror
3 concave rear mirror
4 laser beam
5 beam expansion with divergence adjustment
6 turning mirror
7 focusing lens
8 focusing plane of the observation (work plane)
9 observation direction
10 semi-reflecting layer
11 convex end of the rod
12 convex rear mirror

What is claimed is:

1. A stable resonator for solid-state lasers with a laser rod which exhibits a thermally induced positive lensing effect, a rear mirror and a semi-reflecting output mirror, wherein the rear mirror is convex, the end of the laser rod facing the rear mirror is also convex, and the output mirror is arranged a short distance from the other end of the laser rod, so that the laser rod is arranged asymmetrically between the output mirror and the rear mirror.

2. The resonator according to claim 1, wherein the laser rod is Nd:YAG, Er:YAG, Ho:YAG, or Nd:glass rod.

3. The resonator according to claim 1, wherein the output mirror is arranged at a distance of less than approximately 10 mm to the other end of the laser rod.

4. The resonator of claim 1, wherein the semi-reflecting output mirror is integral with an end of the laser rod.

5. The resonator of claim 1, wherein the semi-reflecting output mirror is planar.

6. A stable resonator for solid-state lasers with a laser rod which exhibits a thermally induced positive lensing effect, a rear mirror and a semi-reflecting output mirror, wherein the rear mirror is convex, the end of the laser rod facing the rear mirror is planar, the other end of the laser rod is convex, and the output mirror is formed by the other end of the laser rod, wherein this end is semi-reflecting.

7. The resonator according to claim 6, wherein the laser rod is Nd:YAG, Er:YAG, Ho:YAG, or Nd:glass rod.

8. The resonator of claim 6, wherein the semi-reflecting output mirror is planar.

9. A stable resonator for solid-state lasers with a laser rod which exhibits a thermally induced positive lensing effect, a rear mirror and a semi-reflecting output mirror, wherein the rear mirror is convex, the end of the laser rod facing the rear mirror is planar, the other end of the laser rod is convex, and the output mirror is arranged a short distance from the other end of the laser rod, so that the laser rod is arranged asymmetrically between the output mirror and the rear mirror.

10. The resonator according to claim 9, wherein the laser rod is Nd:YAG, Er:YAG, Ho:YAG, or Nd:glass rod.

11. The resonator according to claim 9, wherein the output mirror is arranged at a distance of less than approximately 10 mm to the other end of the laser rod.

12. The resonator of claim 9, wherein the semi-reflecting output mirror is planar.

13. A laser for producing a laser beam comprising:
 a resonator comprising a convex mirror and a semi-reflecting mirror; and
 a portion of lasing material that is disposed within the resonator;
 wherein the laser has a change in a focus diameter of the laser beam of less than 2% for a pump power change of at least one 1.0 kilowatts.

14. The laser of claim 13, wherein the laser has a change in a focus diameter of the laser beam of less than 9.1% for a pump power change of 2.0 kilowatts.

15. The laser of claim 13, wherein the semi-reflecting mirror has a planar curvature.

16. The laser of claim 13, wherein the end of the portion of the lasing material that is proximate to the convex mirror has a convex curvature.

17. The laser of claim 13, wherein the end of the portion of the lasing material that is proximate to the convex mirror has a planar curvature.

18. The laser of claim 13, wherein the end of the portion of the lasing material that is distant from the convex mirror has a convex end.

19. The laser of claim 13, wherein the portion of the lasing material is asymmetrically disposed within the resonator.

20. The laser of claim 13, wherein the portion of the lasing material has a thermally induced positive lensing effect.

21. The laser of claim 13, wherein the semi-reflecting mirror is located on an end of the portion of the lasing material.

22. The laser of claim 13, wherein the portion of the lasing material is a laser rod.

23. The laser of claim 13, wherein the portion of the lasing material comprises one of Nd:YAG, Er:YAG, Ho:YAG, and Nd:glass.

24. The laser of claim 13, wherein the semi-reflecting mirror is located less than 10 mm from the portion of the lasing material.

* * * * *